(12) United States Patent
Itoh

(10) Patent No.: US 11,203,648 B2
(45) Date of Patent: Dec. 21, 2021

(54) ESTERIFIED STARCH AND STARCH-CONTAINING PLASTIC COMPOSITION

(71) Applicant: JAPAN CORN STARCH CO., LTD., Tokyo (JP)

(72) Inventor: Kengou Itoh, Hekinan (JP)

(*) Notice: Subject to any disclaimer, the term of this patent is extended or adjusted under 35 U.S.C. 154(b) by 74 days.

(21) Appl. No.: 16/337,840

(22) PCT Filed: Dec. 21, 2016

(86) PCT No.: PCT/JP2016/088152
§ 371 (c)(1),
(2) Date: Mar. 28, 2019

(87) PCT Pub. No.: WO2018/061228
PCT Pub. Date: Apr. 5, 2018

(65) Prior Publication Data
US 2020/0040109 A1    Feb. 6, 2020

(30) Foreign Application Priority Data
Sep. 30, 2016    (JP) .............................. JP2016-193995

(51) Int. Cl.
*C08B 31/02* (2006.01)
*C08L 3/06* (2006.01)
*C08L 67/02* (2006.01)

(52) U.S. Cl.
CPC ............... *C08B 31/02* (2013.01); *C08L 3/06* (2013.01); *C08L 67/02* (2013.01); *C08L 2201/06* (2013.01)

(58) Field of Classification Search
CPC ............. C08B 31/02; C08L 3/06; C08L 67/02
USPC .......................................................... 524/51
See application file for complete search history.

(56) References Cited

U.S. PATENT DOCUMENTS

| | | | |
|---|---|---|---|
| 5,714,601 A | 2/1998 | Tanaka et al. | |
| 2001/0037018 A1 | 11/2001 | Kakuschke et al. | |
| 2006/0107945 A1 | 5/2006 | Narayan et al. | |
| 2010/0311874 A1 | 12/2010 | Mentink et al. | |
| 2011/0196071 A1 | 8/2011 | Mentink et al. | |

FOREIGN PATENT DOCUMENTS

| | | | | |
|---|---|---|---|---|
| CN | 101283034 A | 10/2008 | | |
| CN | 101418081 A | 4/2009 | | |
| EP | 0791604 A1 | 8/1997 | | |
| EP | 1142911 A1 | 10/2001 | | |
| JP | 05-200822 A | 8/1993 | | |
| JP | 8-188601 A | 7/1996 | | |
| JP | 9-31103 A | 2/1997 | | |
| JP | 2579843 B2 * | 2/1997 | ................ | C08L 3/06 |
| JP | 9-67468 A | 3/1997 | | |
| JP | 9-137069 A | 5/1997 | | |
| JP | 10-101465 A | 4/1998 | | |
| JP | 10-101501 A | 4/1998 | | |
| JP | 2000-159801 A | 6/2000 | | |
| JP | 2000-516282 A | 12/2000 | | |
| JP | 2001-316520 A | 11/2001 | | |
| JP | 2003-055470 A | 2/2003 | | |
| JP | 2004-204197 A | 7/2004 | | |
| JP | 2004-262217 A | 9/2004 | | |
| JP | 2007-222704 A | 9/2007 | | |
| JP | 2008-520814 A | 6/2008 | | |
| JP | 2009-511715 A | 3/2009 | | |
| JP | 2011-511121 A | 4/2011 | | |
| JP | 4815448 B2 * | 11/2011 | ............ | C08B 31/04 |
| JP | 2012-505281 A | 3/2012 | | |
| JP | 2015-042745 A | 3/2015 | | |
| WO | 2006/055504 A2 | 5/2006 | | |
| WO | 2007/044803 A1 | 4/2007 | | |
| WO | 2008/044588 A1 | 4/2008 | | |

OTHER PUBLICATIONS

Japanese Office Action for Application No. 2016-193995, dated Aug. 18, 2020, 5 pages.
De Graaf et al., The Acetylation of Starch by Reactive Extrusion. Starch. 1998;50(5): 198-205.
Moad, Chemical modification of starch by reactive extrusion. Progress in Polymer Science. 2011;36:218-237.
Japanese Notification for Application No. 2016-193995, dated Jun. 19, 2018, 16 pages.
International Search Report for Application No. PCT/JP2016/088152, dated Mar. 28, 2017, 6 pages.
Hablot et al., Reactive extrusion of glycerylated starch and starch-polyester graft copolymers. European Polymer Journal. 2013;49:873-881.
Miladinov et al., Starch esterification by reactive extrusion. Industrial Crops and Products. 2000;11:51-57.
Raquez et al., In Situ Compatibilization of Maleated Thermoplastic Starch/Polyester Melt-Blends by Reactive Extrusion. Polym Eng Sci. 2008;48:1747-1754.
Raquez et al., Maleated thermoplastic starch by reactive extrusion. Carbohydrate Polymers. 2008;74:159-169.

(Continued)

*Primary Examiner* — Deve V Hall
(74) *Attorney, Agent, or Firm* — McCarter & English, LLP; Wei Song; Gina M. Stewart

(57) ABSTRACT

There is provided esterified starch which can be produced without using a non-aqueous organic solvent and has water resistance and miscibility with another plastic, and a starch-containing plastic composition. The esterified starch is obtained such that a starch mixture containing starch and a polyhydric alcohol, which is subjected to a heat treatment, is esterified with a vinyl ester and carbonate. Since the starch in the starch mixture enters a state in which starch granules are disintegrated by the polyhydric alcohol, by heating the starch mixture containing starch and a polyhydric alcohol, it is possible to esterify the starch without using a non-aqueous organic solvent and to obtain esterified starch having a high ester substitution degree. According to the esterified starch of the present invention, it is possible to obtain a starch-containing plastic composition having high hydrophobicity, and excellent water resistance and miscibility with another plastic.

5 Claims, No Drawings

(56) References Cited

OTHER PUBLICATIONS

Zuo et al., Study on the preparation of maleated thermoplastic starch by reactive extrusion. Journal of Thermoplastic Composite Materials. 2014;29(3):397-409.
Chinese Office Action for Application No. 201680089634.6, dated Nov. 2, 2020, 15 pages.
Wilpiszewska et al., Chemical modification of starch by reactive extrusion. Polimery. 2008;(4):268-275.

* cited by examiner

ESTERIFIED STARCH AND STARCH-CONTAINING PLASTIC COMPOSITION

CROSS-REFERENCE TO RELATED APPLICATIONS

This application is a U.S. national stage filing, under 35 U.S.C. § 371(c), of International Application No. PCT/JP2016/088152, filed on Dec. 21, 2016, which claims priority to Japanese Patent Application No. 2016-193995, filed on Sep. 30, 2016. The entire contents of each of the aforementioned applications are incorporated herein by reference.

TECHNICAL FIELD

The present invention relates to a starch-containing plastic composition that can be used as a molded body or a film and esterified starch which is a precursor.

BACKGROUND ART

In recent years, consciousness of environmental problems has increased, and various biodegradable plastic materials have been used. One type of composition used for biodegradable plastic materials is a starch composition. The starch constituting the starch composition can be collected from crops such as corn, potato, tapioca, rice, or wheat, and there is no concern of depletion unlike raw materials collected from petroleum. Therefore, a possibility of permanent use is expected. However, it has been necessary to use a plasticizer based on phthalic acid ester or the like for the starch composition in order to obtain molding processability such as injection moldability of thermoplastic plastic or the like.

As a starch composition having thermoplasticity without using a plasticizer, there is a starch ester described in Japanese Unexamined Patent Application, First Publication No. 2000-159801. This starch ester is provided with thermoplasticity and has molding processability by substituting hydrogen of a hydroxyl group in a starch molecule with a short chain acyl group and a long chain acyl group with a high substitution degree and esterifying the starch.

SUMMARY OF THE INVENTION

Esterified starch is required to have water resistance and miscibility with another plastic in order to make the esterified starch be usable for a starch-containing plastic composition that can be used as a molded body or a film. The esterified starch is required to have a high ester substitution degree in order for the esterified starch to meet the requirements.

In addition, in order to increase the ester (acyl) substitution degree like the starch ester described in Japanese Unexamined Patent Application, First Publication No. 2000-159801, it is necessary to esterify the starch by dissolving it in a non-aqueous organic solvent such as pyridine or dimethyl sulfoxide. The use of a non-aqueous organic solvent is not environmentally friendly from the viewpoint of environmental problems. Accordingly, there was a problem in that it is desired to reduce the use of an organic solvent when producing a starch composition having a high ester substitution degree.

The present invention is made to solve the above-described problem, and an object of the present invention is to provide esterified starch which can be produced without using a non-aqueous organic solvent and has water resistance and miscibility with another plastic, and a starch-containing plastic composition.

Esterified starch according to the present invention is obtained by performing an esterification treatment on a starch mixture containing starch and a polyhydric alcohol, which is subjected to a heat treatment, with a vinyl ester and carbonate.

According to the esterified starch of the present invention, since the starch contained in the starch mixture enters a state in which starch granules are disintegrated by the polyhydric alcohol, by heating the starch mixture containing starch and a polyhydric alcohol, it is possible to esterify the starch without using a non-aqueous organic solvent and to obtain esterified starch having a high ester substitution degree. Since the ester substitution degree is high, the esterified starch of the present invention can have high hydrophobicity, and excellent water resistance and miscibility with another plastic.

Here, in the above-described esterified starch, the esterification treatment may be performed without substantially using an organic solvent. According to this, esterified starch can be produced without substantially using an organic solvent. Therefore, it is possible to make the esterified starch be environmentally friendly from the viewpoint of environmental problems.

In addition, in the above-described esterified starch, the starch mixture may contain a dibasic acid. According to this, it is possible to make the starch contained in the starch mixture be easily hydrolyzed by the dibasic acid, make the molecular weight of the starch easily decrease due to the hydrolysis and make an esterification treatment reaction of the starch easily proceed.

In addition, in the above-described esterified starch, the carbonate may contain sodium carbonate. According to this, a catalytic action suitably acts on the esterified starch using sodium carbonate, which can make an esterification treatment reaction easily proceed. Therefore, it is possible to make the esterified starch of the present invention have excellent production efficiency.

In addition, in the above-described esterified starch, the heat treatment may be performed while the starch mixture is kneaded using a twin-screw extruder. According to this, since the twin-screw extruder has a high shear force, the starch granules are easily disintegrated in a short period of time and can be continuously heated. Therefore, continuous production with a compact facility can be performed.

In addition, in the above-described esterified starch, the ester substitution degree of the esterified starch may be 1.0 to 2.9. According to this, it is possible to make the esterified starch have high hydrophobicity, excellent water resistance, excellent miscibility with another plastic, and excellent production efficiency.

It is possible to make a starch-containing plastic composition containing the esterified starch and plastic. According to this, the starch-containing plastic composition contains the esterified starch and plastic, and therefore can have excellent impact resistance or plasticity.

In addition, in the above-described starch-containing plastic composition, the plastic may be biodegradable plastic. According to this, the esterified starch has biodegradability, it is possible to make the starch-containing plastic composition of the present invention into a biodegradable composition and be environmentally friendly.

According to the esterified starch of the present invention, since the starch contained in the starch mixture enters a state in which starch granules are disintegrated by the polyhydric alcohol, by heating the starch mixture containing starch and a polyhydric alcohol, it is possible to esterify the starch without using a non-aqueous organic solvent and to obtain esterified starch having a high ester substitution degree. Since the ester substitution degree is high, the esterified starch of the present invention can have high hydrophobicity, and excellent water resistance and miscibility with another plastic.

DETAILED DESCRIPTION

Hereinafter, an embodiment of the present invention will be described. In the present invention, the esterified starch refers to plasticized starch esterified with a vinyl ester for improving water resistance and miscibility with another plastic. The starch-containing plastic composition refers to a composition obtained by making the esterified starch contain plastic made of another resin to impart characteristics such as impact resistance or biodegradability to the esterified starch. The plastic refers to a plastic material that can be molded into a useful shape using a polymer material as a main raw material. The non-aqueous organic solvent refers to an organic solvent incompatible with water.

In the esterified starch and a method for producing esterified starch according to the embodiment, a starch mixture containing starch and a polyhydric alcohol, which is subjected to a heat treatment, is esterified with a vinyl ester and carbonate.

Starch is a polysaccharide stored in tissue of a plant or the like, and starch can be collected from various grains, and its use is not restricted depending on the types of grains. As an example of starch, corn starch, potato starch, tapioca starch, rice starch, wheat starch, and a mixture thereof can be used. Starch which is a dried product of a powdery body can be preferably used.

A polyhydric alcohol is a compound having two or more hydroxyl groups in one molecule and acts as a plasticizer for starch. Since starch granules enter a state in which these are disintegrated by a polyhydric alcohol, it is possible to esterify the starch granules without using a non-aqueous organic solvent and to obtain esterified starch having a high ester substitution degree. The polyhydric alcohol is bonded to starch in a heat treatment to be described below and is discharged in a washing process after the esterification. It is possible to use glycerin, ethylene glycol, and the like as the polyhydric alcohol.

A dibasic acid is a compound having two carboxy groups in one molecule and acts as an acid. The dibasic acid hydrolyzes starch to reduce the molecular weight of the starch. Decreased molecular weight of the starch makes an esterification treatment reaction to be described below easily proceed and provides excellent production efficiency of esterified starch. It is possible to use a maleic acid, a succinic acid, an itaconic acid, a phthalic acid, maleic anhydride, succinic anhydride, itaconic anhydride, phthalic anhydride, and a mixture thereof as the dibasic acid. Among these, one containing anhydrous dibasic acid that can further reduce the molecular weight of starch can be preferably used, and one containing maleic anhydride is particularly preferable.

The esterified starch is obtained such that a starch mixture containing starch and a polyhydric alcohol is subjected to a heat treatment and is esterified with a vinyl ester and carbonate. The starch mixture containing starch and a polyhydric alcohol becomes plasticized starch through the heat treatment. The plasticized starch becomes an esterified starch through an esterification treatment using vinyl ester and carbonate.

The plasticized starch becomes plasticized starch by subjecting a starch mixture containing 5 to 65 parts by mass of a polyhydric alcohol with respect to 100 parts by mass of starch to a heat treatment. At this time, it is unnecessary to intentionally volatilize moisture contained in the plasticized starch except for moisture which is volatilized during the heat treatment.

The plasticized starch is generated by subjecting a starch mixture containing 5 to 65 parts by mass of a polyhydric alcohol and 0.3 to 3.0 parts by mass of a dibasic acid with respect to 100 parts by mass of starch to a heat treatment. According to this, it is possible to make the starch into plasticized starch in which the starch is easily hydrolyzed by the dibasic acid, the molecular weight easily decreases due to hydrolysis, and an esterification treatment reaction of the starch easily proceeds.

The heat treatment is preferably performed while applying a shear force to the mixture using a twin-screw extruder. Since the starch granules are disintegrated by the polyhydric alcohol, the starch granules are further disintegrated by an external force of the twin-screw extruder. This is because it is possible to obtain superior production efficiency. In addition, it is also preferable that continuous production can be performed.

The heating temperature for the heat treatment is preferably 100° C. to 200° C. because the starch is easily plasticized. There is a concern that the starch may not be plasticized if the heating temperature is lower than 100° C. In contrast, the heat treatment is excessively performed if the heating temperature exceeds 200° C., which is not preferable from the viewpoint of energy. The heating temperature is more preferably 120° C. to 180° C. and still more preferably 130° C. to 170° C.

The time for the heat treatment is preferably 1 to 10 minutes. This is because it is a sufficient time for the plasticization of the starch. There is a concern that it may be insufficient for the plasticization of the starch if the time for the heat treatment is shorter than 1 minute. In contrast, the heat treatment is excessively performed if the time for the heat treatment exceeds 10 minutes, which is not preferable from the viewpoint of energy. The time for the heat treatment is more preferably 2 to 5 minutes. The time for the heat treatment depends on the passing time of the starch through the extrusion stirrer, and therefore, depends on the rotational speed of the extrusion stirrer.

The plasticized starch is esterified with a vinyl ester and carbonate to become esterified starch. The esterification of plasticized starch makes the plasticized starch have water resistance. The esterification is performed by adding 50 to 300 parts by mass of vinyl ester, 5 to 30 parts by mass of carbonate, and 5 to 20 parts by mass of water to 100 parts by mass of plasticized starch and refluxing the mixture under heating without substantially adding an organic solvent thereto. Substantially adding no organic solvent thereto prevents the present invention from being ineffective since, in some cases, an organic solvent to be added for the purpose of, for example, a film-forming aid, a plasticizer, or other additives may be added to plasticized starch during esterification. That is, the addition of an organic solvent performed for the purpose of a film-forming aid, a plasticizer or other additives other than the purpose of increasing the ester substitution degree does not mean that an organic solvent is substantially added.

The vinyl ester is an ester of an organic acid and a vinyl alcohol, and esterification of plasticized starch makes it possible to allow the plasticized starch to have excellent water resistance. Vinyl formate (1), vinyl acetate (2), vinyl propionate (3), vinyl acrylate (3), vinyl butanoate (4), vinyl procrastinate (4), vinyl pentanoate (5), vinyl hexanoate (6), vinyl heptanoate (7), vinyl octanoate (8), vinyl nonanoate (9), vinyl decanoate (vinyl caprate) (10), vinyl dodecanoate (vinyl laurate) (12), vinyl palmitate (16), vinyl stearate (18), vinyl oleate (18), or a mixture thereof can be used as vinyl esters (number of carbons of an acyl group).

It is preferable to use a vinyl ester having an acyl group (short chain acyl group) having 2 to 4 carbon atoms as the vinyl ester. This is because it is possible to obtain esterified starch having superior water resistance. Vinyl acetate (2) or vinyl propionate (3) is more preferable and vinyl acetate (2) is still more preferable.

Carbonate is a catalyst for esterification, and therefore, it is possible to use sodium carbonate, sodium hydrogen carbonate, or a mixture thereof. Among these carbonates, sodium carbonate can be more favorably used. This is because the reaction rate of esterification becomes faster.

Esterification occurs by exchanging a hydroxy group of plasticized starch with an organic acid that forms an ester of a vinyl ester. When vinyl ester is vinyl acetate, acetic acid which is an organic acid becomes an acetyl group and the hydroxy group of plasticized starch is substituted with an acetyl group (acetylation). Plasticized starch has inferior water resistance and swells with water. However, esterified (acetylated) plasticized starch can become esterified starch having excellent water resistance.

Here, the ester substitution degree means an average number of substituents of (three) reactive hydroxyl groups of glucose in starch. In a case where the ester substitution degree is 3, this means that all the (three) reactive hydroxyl groups are subjected to ester substitution using a vinyl ester. It is preferable that the ester substitution degree of esterified starch is 1.0 to 2.9. This is because esterified starch having an ester substitution degree within this range has high hydrophobicity, excellent water resistance, excellent miscibility with another plastic, and excellent production efficiency. In a case where the ester substitution degree is less than 1.0, there is a concern that the esterified starch may have weak hydrophobicity and have poor water resistance and miscibility with another plastic. In contrast, when the ester substitution degree exceeds 2.9, there is a concern that it may take much time to raise the temperature for the ester substitution and perform refluxing, and production efficiency may be deteriorated. The ester substitution degree is preferably 1.5 to 2.7 and more preferably 2.0 to 2.5.

The esterified starch can be bleached using water after the esterification. Bleaching is performed by adding an aqueous sodium hydroxide solution to increase the pH, and then adding a hydrogen peroxide solution thereto. After bleaching, the pH of the esterified starch is adjusted by adding a sulfuric acid, followed by dehydration and drying.

In the starch-containing plastic composition and the method for producing a starch-containing plastic composition according to the embodiment, esterified starch and plastic are heated and mixed with each other using an injection molding machine.

When esterified starch contains plastic, it is possible to make the esterified starch further have impact resistance and plasticity, and the esterified starch can be used for an agricultural multi-sheet or the like. The plastic is preferably a biodegradable plastic. This is because it can be made into a biodegradable composition and can be made environmentally friendly.

Those, such as polyhydroxy butyric acid, polycaprolactone, butylene polysuccinate, and polylactic acid, generally recognized as biodegradable plastics can be used as biodegradable plastics. Specifically, it is possible to use PBSA (BIONOLE 3001MD (SHOWA DENKO K.K.)), PBAT (ECOFLEX (BASF Japan Co., Ltd.)), and the like.

EXAMPLES

Hereinafter, the present invention will be described in more detail using examples. Example 1 is an example which becomes a best mode.

Example 1

Production of Plasticized Starch

Starch (25 kg), glycerin (6.25 kg) and maleic anhydride (0.125 kg) were mixed with each other using a henschel mixer to prepare a mixture. The mixture was heat-treated using a twin-screw extruder to obtain plasticized starch 1.

The heat treatment conditions of the twin-screw extruder are described below.

Device: HYPERKTX 46 (Kobe Steel, Ltd.)
Screw diameter: 46 mm
Feeder: 20 kg/h
Rotational frequency: 100 rpm.
Barrel temperature:
95° C./125° C./140° C./160° C./165° C./165° C./165° C./150° C./140° C./130° C.
Outlet temperature of plasticized starch after heat treatment: 150° C.

Physical properties of the obtained plasticized starch 1 are described below.

Number-average molecular weight: 4,139
Weight average molecular weight: 15,315

Production of Esterified Starch

Plasticized starch 1 (10.0 kg), vinyl acetate (19.5 kg), sodium carbonate (2.0 kg), and water (1.0 kg) were mixed with each other using a henschel mixer to prepare a mixture. After the mixture was heated and refluxed using a reaction container, water was placed in the reaction container. Then, the mixture was pulverized through high speed stirring to prepare a pulverized material. The pulverized material (dispersed in water) was bleached, dehydrated, and dried to obtain esterified starch 1.

The conditions of the heating and refluxing are described below.

Set temperature for reaction container: 80° C.
Time for heating and refluxing: 6 hours
The conditions of washing are described below.
pH Adjustment: adjusted to pH 9 with 10 mass % sodium hydroxide solution
Detergent: 4 kg of 35 mass % hydrogen peroxide solution (Stirring for 20 minutes while maintaining pH 9)
pH Adjustment: adjusted to pH 7 with 30 mass % sulfuric acid solution
The condition of drying is described below.
Drying condition: 50° C./day after dehydration Physical properties of the obtained esterified starch 1 are described below.

Ester substitution degree: 2.11
Tg: 154.7° C. (start), 167.2° C. (end)
Number-average molecular weight: 5,039
Weight average molecular weight: 19,618

Production of Starch-Containing Plastic Composition

Esterified starch 1 (10.0 kg) and biodegradable plastic (PBAT (ECOFLEX (BASF Japan Co., Ltd.))) (10.0 kg) were heated and mixed with each other using an injection molding machine to obtain a starch-containing plastic composition 1.

Physical properties of the obtained starch-containing plastic composition 1 are described below.

Biodegradability: biodegradability is provided (accelerated environmental test)

Water resistance: no abnormality for 8 hours of immersion

Impact resistance: no abnormality

Example 2

Production of Plasticized Starch

Starch (25 kg) and glycerin (6.25 kg) were mixed with each other using a henschel mixer to prepare a mixture. The mixture was heat-treated using a twin-screw extruder to obtain plasticized starch 2. The plasticized starch 2 is different from the plasticized starch 1 of Example 1 in that maleic anhydride (dibasic acid) is not contained. Other production conditions are the same as those in Example 1.

Physical properties of the obtained plasticized starch 2 are described below.

Number-average molecular weight: 7,764
Weight average molecular weight: 35,535

Production of Esterified Starch

Esterified starch 2 was obtained through the method for producing esterified starch in the same manner as in Example 1.

Physical properties of the obtained esterified starch 2 are described below.

Ester substitution degree: 2.11
Tg: 160.3° C. (start), 169.1° C. (end)
Number-average molecular weight: 8,876
Weight average molecular weight: 37,760

Production of Starch-Containing Plastic Composition

Esterified starch 2 (10.0 kg) and biodegradable plastic (PBAT (ECOFLEX (BASF Japan Co., Ltd.))) (12.0 kg) were heated and mixed with each other using an injection molding machine to obtain a starch-containing plastic composition 2.

Physical properties of the obtained starch-containing plastic composition 2 are described below.

Biodegradability: biodegradability is provided (accelerated environmental test)

Water resistance: no abnormality for 8 hours of immersion

Impact resistance: no abnormality

Example 3

Production of Plasticized Starch

Starch (25 kg), glycerin (6.25 kg) and maleic anhydride (0.625 kg) were mixed with each other using a henschel mixer to prepare a mixture. The mixture was heat-treated using a twin-screw extruder to obtain plasticized starch 3. Other production conditions are the same as those in Example 1.

Physical properties of the obtained plasticized starch 3 are described below.

Number-average molecular weight: 2,201
Weight average molecular weight: 6,873

Production of Esterified Starch

Plasticized starch 3 (10.0 kg), vinyl acetate (21.5 kg), sodium hydrogen carbonate (2.0 kg), and water (1.0 kg) were mixed with each other using a henschel mixer to prepare a mixture. After the mixture was heated and refluxed using a reaction container, water was placed in the reaction container. Then, the mixture was pulverized through high speed stirring to prepare a pulverized material. The pulverized material (dispersed in water) was washed and dried to obtain esterified starch 3. The esterified starch 3 is greatly different from the esterified starch 1 of Example 1 in that sodium hydrogen carbonate is used instead of sodium carbonate (carbonate).

Compared with the esterified starch 1 of Example 1, the esterified starch 3 took 24 hours for heating and refluxing, and the production efficiency was slightly inferior.

Physical properties of the obtained esterified starch 3 are described below.

Ester substitution degree: 2.20
Tg: 130.6° C. (start), 144.6° C. (end)
Number-average molecular weight: 2,764
Weight average molecular weight: 8,812

Production of Starch-Containing Plastic Composition

Esterified starch 3 (10.0 kg) and biodegradable plastic (PBAT (ECOFLEX (BASF Japan Co., Ltd.))) (8.0 kg) were heated and mixed with each other using an injection molding machine to obtain a starch-containing plastic composition 3.

Physical properties of the obtained starch-containing plastic composition 3 are described below.

Biodegradability: biodegradability is provided (accelerated environmental test)

Water resistance: no abnormality for 8 hours of immersion

Impact resistance: no abnormality

Examples 4 to 6

Production of Plasticized Starch

The plasticized starch 3 of Example 3 was used.

Production of Esterified Starch

In Examples 4 to 6, the content of sodium carbonate was changed when producing esterified starch. Other than that, the conditions are the same as those in Example 1. Specifically, 1.0 kg of sodium carbonate (Example 4), 2.0 kg of sodium carbonate (Example 5), and 3.0 kg of sodium carbonate (Example 6) were set with respect to the plasticized starch 3 (10.0 kg), vinyl acetate (21.5 kg), and water (1.0 kg) to produce esterified starches 4 to 6.

Physical properties of the obtained esterified starches 4 to 6 are described below.

Esterified starch 4 (Example 4)
Ester substitution degree: 2.07
Tg: 147.2° C. (start), 159.1° C. (end)
Number-average molecular weight: 3,317
Weight average molecular weight: 9,753
Esterified starch 5 (Example 5)
Ester substitution degree: 2.61
Tg: 94.6° C. (start), 115.9° C. (end)
Number-average molecular weight: 2,213
Weight average molecular weight: 8,322
Esterified starch 6 (Example 6)
Ester substitution degree: 2.57
Tg: 94.6° C. (start), 112.0° C. (end)
Number-average molecular weight: 2,037
Weight average molecular weight: 7,464

Production of Starch-Containing Plastic Composition

Each of the esterified starches 4 to 6 (10.0 kg) and biodegradable plastic (PBAT (ECOFLEX (BASF Japan Co., Ltd.))) (8.0 kg) were heated and mixed with each other using an injection molding machine to obtain starch-containing plastic compositions 4 to 6.

The obtained starch-containing plastic compositions 4 to 6 had physical properties as follows.

Biodegradability: biodegradability is provided (accelerated environmental test)

Water resistance: no abnormality for 8 hours of immersion

Impact resistance: no abnormality

The invention claimed is:

1. A method for producing an esterified starch, the method comprising:
   heat treating a starch mixture containing starch and a polyhydric alcohol, and
   esterifying the starch mixture with a vinyl ester and carbonate in an absence of an organic solvent.

2. The method for producing an esterified starch according to claim 1, wherein the starch mixture contains a dibasic acid.

3. The method for producing an esterified starch according to claim 1, wherein the carbonate contains sodium carbonate.

4. The method for producing an esterified starch according to claim 1, wherein the heat treating is performed while the starch mixture is kneaded using a twin-screw extruder.

5. The method for producing an esterified starch according to claim 1, wherein an ester substitution degree of the esterified starch is 1.0 to 2.9.

* * * * *

UNITED STATES PATENT AND TRADEMARK OFFICE
CERTIFICATE OF CORRECTION

| | |
|---|---|
| PATENT NO. | : 11,203,648 B2 |
| APPLICATION NO. | : 16/337840 |
| DATED | : December 21, 2021 |
| INVENTOR(S) | : Kengou Itoh |

It is certified that error appears in the above-identified patent and that said Letters Patent is hereby corrected as shown below:

On the Title Page

Please add:
(73) Assignee: JAPAN CORN STARCH CO., LTD., Tokyo (JP)

Signed and Sealed this
Eighth Day of November, 2022

Katherine Kelly Vidal
*Director of the United States Patent and Trademark Office*